United States Patent
Schwarzbich et al.

(10) Patent No.: US 7,360,836 B2
(45) Date of Patent: Apr. 22, 2008

(54) SEAT INSERT AND METHOD FOR PRODUCING THE SAME

(75) Inventors: Jörg Schwarzbich, Wertherstrasse 15, Bielefeld (DE) 33615; Hermann W. Rutsch, Delbrück (DE)

(73) Assignee: Jorg Schwarzbich, Bielefeld (DE)

( * ) Notice: Subject to any disclaimer, the term of this patent is extended or adjusted under 35 U.S.C. 154(b) by 456 days.

(21) Appl. No.: 10/511,181

(22) PCT Filed: Apr. 11, 2003

(86) PCT No.: PCT/EP03/03757

§ 371 (c)(1),
(2), (4) Date: Oct. 14, 2004

(87) PCT Pub. No.: WO03/092440

PCT Pub. Date: Nov. 13, 2003

(65) Prior Publication Data

US 2005/0173957 A1    Aug. 11, 2005

(30) Foreign Application Priority Data

May 4, 2002  (DE) ............................... 102 20 028

(51) Int. Cl.
A47C 7/14  (2006.01)

(52) U.S. Cl. ............................... 297/284.4; 297/284.1; 29/527.1

(58) Field of Classification Search ............. 297/284.4; 264/259, 266; 29/527.1
See application file for complete search history.

(56) References Cited

U.S. PATENT DOCUMENTS

| | | | | |
|---|---|---|---|---|
| 4,722,821 A * | 2/1988 | Vermilye | ..................... | 264/273 |
| 5,474,358 A * | 12/1995 | Maeyaert | ................. | 297/284.7 |
| 5,911,477 A * | 6/1999 | Mundell et al. | ......... | 297/284.4 |
| 5,988,745 A * | 11/1999 | Deceuninck | ............. | 297/284.4 |
| 6,152,531 A * | 11/2000 | Deceuninck | ............. | 297/284.4 |
| 6,692,074 B1 * | 2/2004 | Kopetzky et al. | ........ | 297/284.8 |
| 6,746,081 B1 * | 6/2004 | Klingler | .................. | 297/284.4 |
| 2005/0016660 A1 * | 1/2005 | Herbst | ......................... | 156/85 |

FOREIGN PATENT DOCUMENTS

| | | |
|---|---|---|
| AT | 34 066 | 10/1988 |
| DE | 36 11 355 | 10/1989 |
| DE | 198 26 597 | 12/1999 |
| DE | 101 10 138 | 9/2002 |
| EP | 0 780 262 | 6/1997 |
| JP | 01214417 A * | 8/1989 |
| WO | WO 01/10670 | 2/2001 |

\* cited by examiner

*Primary Examiner*—Sarah B. McPartlin
(74) *Attorney, Agent, or Firm*—Richard M. Goldberg

(57) ABSTRACT

Seat inlay in the form of an elastic grid (10;64) having at least two longitudinal bars (14) which are connected by cross bars (16,18) and have hangers (20) for suspending the inlay in a frame of a seat, and the cross bars (16,18) are made of plastic and are molded to the longitudinal bars (14).

11 Claims, 3 Drawing Sheets

SEAT INSERT AND METHOD FOR PRODUCING THE SAME

BACKGROUND OF THE INVENTION

The invention relates to a seat inlay in the form of an elastic grid having at least two longitudinal bars that are connected by cross bars and have hangers for the suspension of the inlay in a seat frame, as well as a method of manufacturing such a seat inlay.

The seat backs of seats, especially vehicle seats, frequently comprise, as a seat inlay, a grid which suitably reinforces the cushioning but provides a certain compliance and hence adapts to the body shape and posture of the user. Typically, this grid is formed by a wire grid which is suspended in the seat back by means of compression springs or tension springs such that the longitudinal bars extend essentially vertically in the plane of the seat back. The longitudinal bars are in most cases formed by bars of spring steel that are coated with plastic. The cross bars which are formed by thinner wires are bent at their ends to form loops which closely surround the longitudinal bars and thus serve for fixing the cross bars at the longitudinal bars.

Frequently, the grid is additionally mounted with a bow-adjustable lordosis support which permits to adapt the contour of the seat back even better to the anatomy of the user and to give better support to the backbone of the user. A support element of the lordosis support is formed by a more or less perforated plastic plate the upper and lower edges of which can be drawn together by means of a Bowden cable, so that the plate bulges and thereby changes the bow. The support element is fixed to the cross bars of the grid in the vicinity of its upper and lower edges, as is described for example in EP-A-0 780 262.

SUMMERY OF THE INVENTION

It is an object of the invention to provide a seat inlay that is more easy to manufacture and to optimise in its elastic properties.

According to the invention, this object is achieved by the feature that the cross bars are made of plastic and are molded to the longitudinal bars.

Thanks to the invention, the cumbersome process of fixing the cross bars, formed by thin wires, to the longitudinal bars becomes obsolete. Instead, the cross bars which are now made of plastic are simply molded to the longitudinal bars, so that the grid as a whole can be injection-molded in one step. In this way, the manufacturing process is greatly simplified.

At the same time, the invention offers the advantageous possibility to vary the shape and the elastic properties of the cross bars such that the shape and hardness of the grid as well as the size of its support area is everywhere adapted to the anatomy of the human body an in optimal way, so that the seat comfort is improved and a healthy seat posture of the user is achieved. To this end, the cross bars may for example be formed with an intrinsic bulge which may be uniform or may be individually adjusted to the mounting height of the respective cross bars. Further, the cross sectional shapes of the cross bars and hence the size of their support surfaces and their elastic properties may be varied from cross bar to cross bar and also over the length of each individual cross bar.

A particularly useful method for manufacturing the seat inlay is characterised in that all the cross bars are molded in one step in a common injection molding die.

Advantageous embodiments of the invention are indicated in the dependent claims.

When the longitudinal bars of the grid are also made of plastic, the whole grid may be formed in one piece by injection molding.

In order to achieve a sufficient overall stability, the longitudinal bars should however have a large bending strength. On the other hand, the cross-sections of the longitudinal bars should not be too large. For this reason, it is considered to be preferable that the longitudinal bars are made of a material that is harder than that of the cross bars.

For example, the longitudinal bars may be made of fibre-reinforced plastic. In this case, the grid could be molded from plastic in a multi-component injection process.

According to another embodiment, the longitudinal bars are formed by bars of spring steel as before, which, at least where the cross bars adjoin, are embedded in the plastic of the cross bars. As an alternative, the spring steel bars may be embedded in plastic in their entirety, so that it is not necessary to provide an extra manufacturing step for coating the spring steel bars with plastic. Likewise is it possible to reinforce the plastic cross bars with insert-molded metal wires, which may then be extended outwardly beyond the longitudinal bars and may at the same time form the hangers and/or springs, e.g. in meandric shape, for the suspension of the grid in the frame of the seat back.

When manufacturing the grid, the spring steel wires forming the longitudinal bars may be supplied into the injection molding die as endless material, may be cut to the desired length when the die is closed, by means of cutters provided at the die-halves, and may then be totally or partly coated with molded plastic.

Particularly suitable is the use of a multi-tier die in which a plurality of grids may be formed in one process step.

The hangers which serve for suspending the grid in the seat frame have heretofore been formed by bending the spring steel wires to hooks or eyelets. In a further development of the method according to the invention, these bending steps may be performed by means of bending tools, which are formed at the injection molding die, when the die is closed or after the die is closed.

As an alternative, it is possible to form the hangers from plastic concurrently with the cross bars by injection molding, either as prolongations of the cross bars or in other positions along the longitudinal bars.

According to a further development of the invention, the support element of the lordosis support, which is made of plastic, anyway, may be molded in one step together with the cross bars of the grid. For example, the support element may be formed in one piece with the cross bars supporting the same. Then, these cross bars must be elastic enough to compensate the variations in length that occur when the bulge of the support element is adjusted.

As an alternative, it is conceivable that sliding supports are formed on suitable straight portions of the longitudinal bars that are formed by spring steel wires, and the plastic of the support element is molded around said sliding supports in the injection molding process. In this way, one obtains a grid in which at least one end of the support element is slidingly guided on the longitudinal bars. When both ends of the support element are slidable, it is possible to provide a so-called four-way lordosis support in which the support element cannot only be adjusted in its bulge but also in its height relative to the grid.

For vehicle seats, active head rests have been developed which, in case of a collision of the vehicle, tilt forward actively in order to capture the head of the user, which is flung rearwardly due to the collision, more early and thereby to avoid a whiplash injury. The tilting movement of the active head rest is triggered by a trigger element which is incorporated in the seat back of the seat and responds to the pressure that is generated by the upper part of he body of the user when the user is forced into the seat back during the collision. The trigger element has a casing or other functional components made of plastic, which accommodate the corresponding sensors and have to be fixed to the grid in a similar way as the support element of the lordosis support. According to a further development of the invention, this casing and/or the other functional components may also be manufactured in one step with the cross bars of the grid.

BRIEF DESCRIPTION OF THE DRAWINGS

Embodiments of the invention will now be explained in conjunction with the drawings, in which.

DETAILED DESCRIPTION

Figure 1:
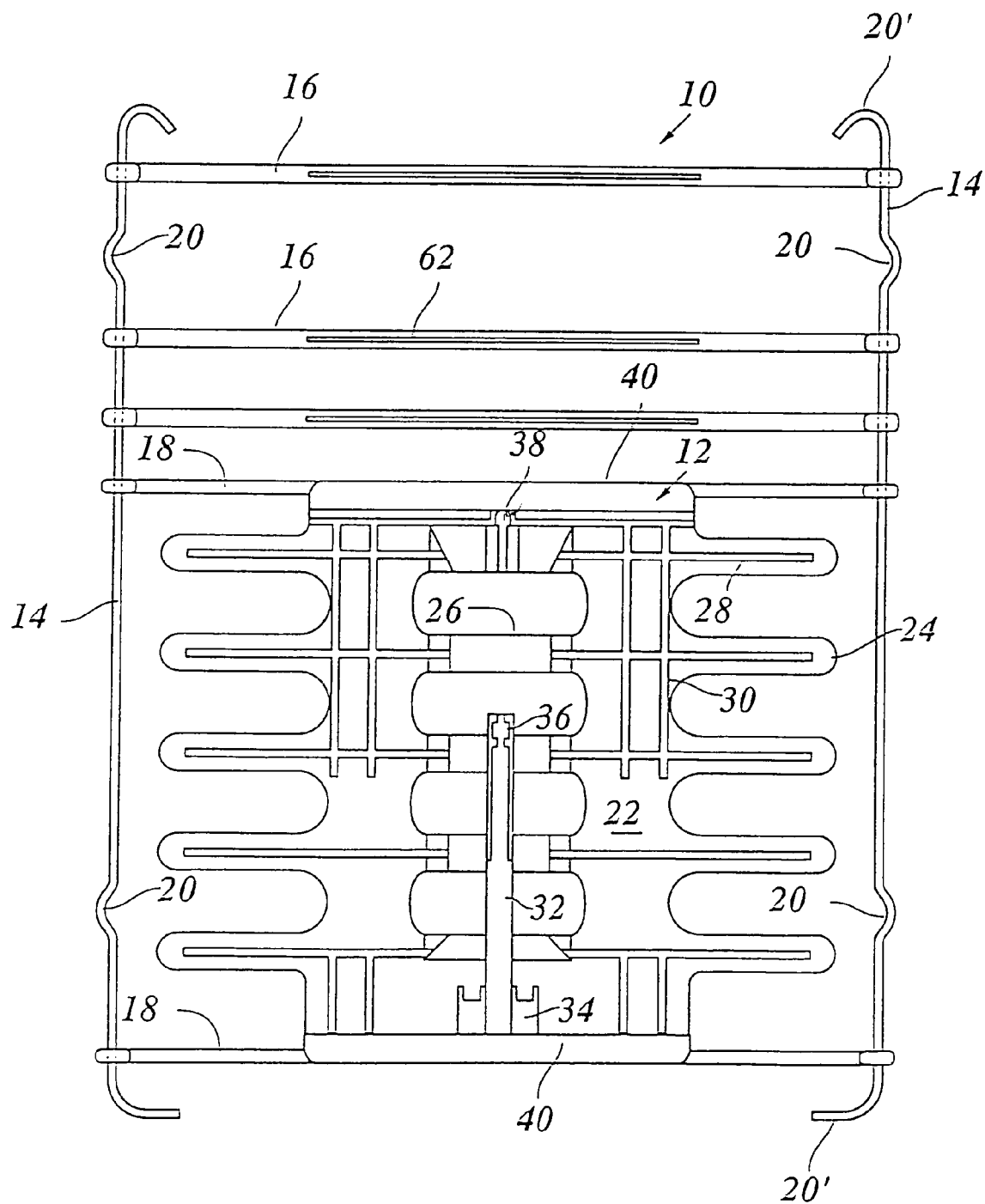
FIG. 1 is a rear view of a grid having a lordosis support.

FIG. 1 shows a grid 10 with a lordosis support 12 fixed thereto. The grid 10 is formed by two longitudinal bars 14 which are bent-over at their ends and are connected by a plurality of rung-like cross bars 18. The longitudinal bars 14 are for example formed by metal wires having a comparatively large cross section and, accordingly, a high bending strength, whereas the cross bars 16, 18 are made of plastic. Each of the longitudinal bars 14 has two bent portions serving as hangers 20 for tension springs which have not been shown and with which the grid 10 is suspended in the frame of a seat back in such a manner that it is held in the cushioning essentially in the plane of the seat back and gives the seat back the necessary amount of stiffness and compliance. Additional hangers 20 are formed by the bent ends of the longitudinal bars 14. Alternatively, the longitudinal bars may be formed as flat bands provided with holes, wherein the holes serve for hooking-in the tension springs.

The lordosis support 12 has an essentially plate-like support element 22 of plastic which forms a plurality of laterally projecting fingers 24 on both sides and is provided with perforations 26 in the central part. The fingers 24 are reinforced on the back side by co-molded ribs 28. By means of ribs 30 which extend at right angles to the ribs 28 but are interrupted locally, the stiffness of the support element 22 is adjusted such that it may elastically flex about a transverse axis and is thereby bulged more or less in the direction normal to the plane of the drawing in FIG. 2. A lever 32 which extends essentially in vertical direction is centrally arranged on the back side of the support element 22 and has its lower end supported tiltably in a bearing 34 of the support element. The top end of the lever 32 forms an anchor point for an outer cable of a Bowden cable which has not been shown. An anchor point 38 for the corresponding inner wire is arranged near the top edge of the support element 22. Consequently, the support element 22 can be subjected to compression stresses in vertical direction by means of the Bowden cable, so that it bulges towards the back of the user.

For being fixed to the wire grid 10, the support element is formed at its upper and lower edges which respective bosses 40 which are each formed in one piece with a respective one of the cross bars 18. Thus, the support element 22 is stably held at the grid 10, so that it may not be torn off. When the support element 22 is bulged and thereby shortened in vertical direction, the cross bars 18 are bent elastically.

Figure 2:
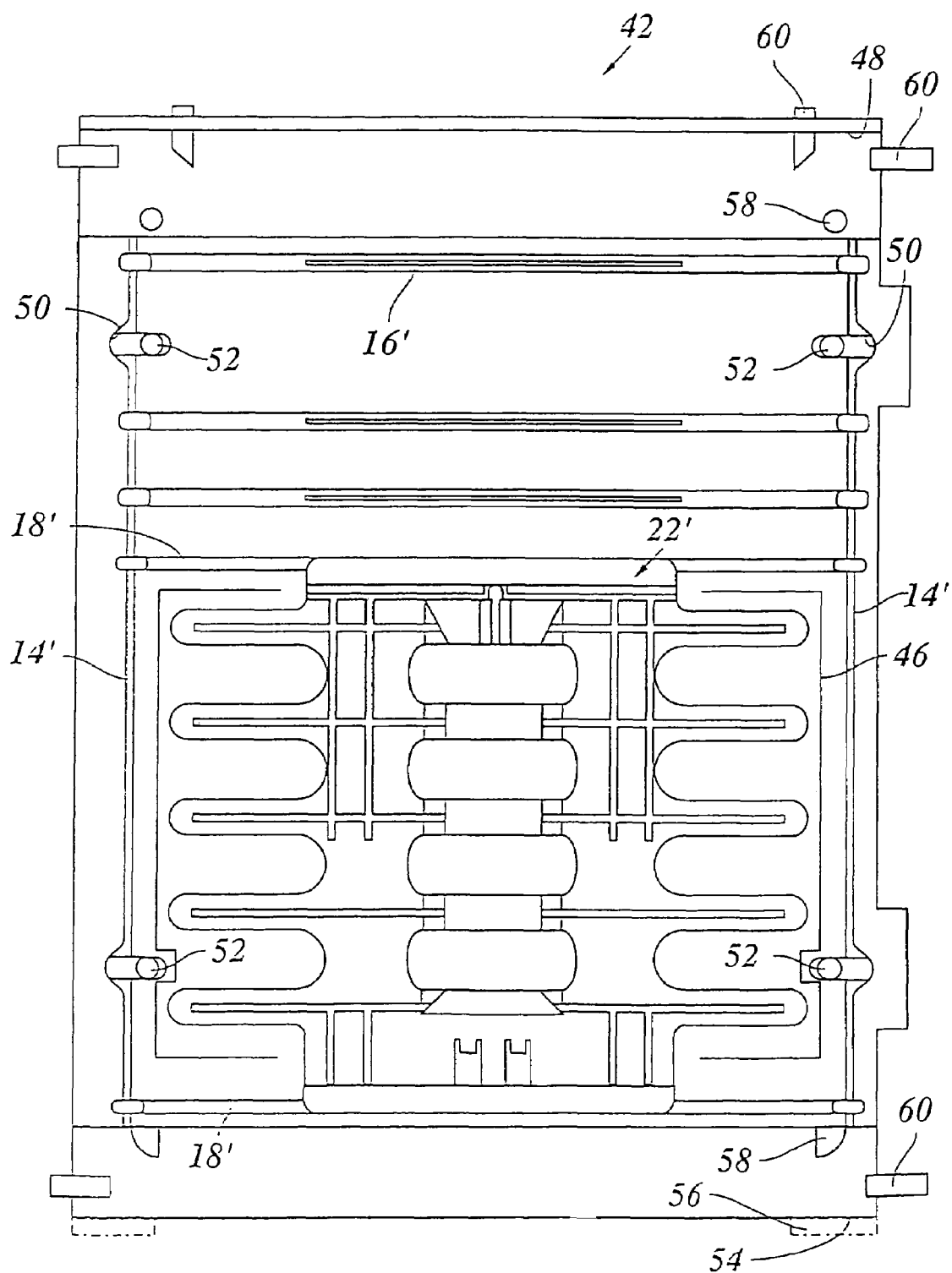
FIG. 2 is a lower die of a tool for manufacturing the grid shown in FIG. 1.

For manufacturing the grid 10, an injection molding tool is used, the lower die 42 of which is shown in FIG. 2. The lower die 42 forms a cavity 22' which serves for molding the back side, visible in FIG. 1, of the support element 22. The portions of the cavity 22' which form the fingers 24 are slightly angled upwardly. To this end, the lower die 42 forms obliquely outwardly rising platforms 46. Outside of the cavity 22' and the platforms 46, the lower die 42 has a flat surface in which longitudinal grooves 14' and molding cavities 16', 18' for the cross bars are formed. The longitudinal grooves 14' have such a depth that they may accommodate the lower half of the cross-section of the longitudinal bars 14, whereas the top half of the cross section is accommodated in corresponding grooves of an upper die which has not been shown.

On the top ends in FIG. 2, the longitudinal grooves 14' are open into an empty space which is limited by a stop 48. On their length, the longitudinal grooves 14' are locally enlarged to form templates 50 with which respective bending tools 52 are associated.

The lower edge of the lower die in FIG. 2 forms a cutting edge 54 which is spaced apart from the associated mouth of the longitudinal grooves 14' and permits to cut the longitudinal bars 14 with cutting tools 56.

The longitudinal bars are initially inserted axially into the longitudinal grooves 14 in a non-bent state and are pushed against the stop 48 and are then cut when the die is closed. Subsequently, the bending tools 52 are drawn outwardly, so that the bent portions for the hangers 20 are formed in the longitudinal bars 14. The bending tools 52 which are arranged at the same longitudinal groove 14' are preferably actuated one after the other, so that the longitudinal bars 14 may be displaced axially in the longitudinal grooves 14' during the bending process, in order to compensate for the increased demand for material caused by the bent portions. Then, the ends 20' of the longitudinal bars 14 are bent in the manner shown in FIG. 1. To this end, the lower die 42 has integrated bending tools 58 and corresponding bending plungers 60.

When the die has been closed and the longitudinal bars 14 have been bent in the desired way, molten plastic is injected simultaneously into the cavities 16', 18' and 22', 50 that the cross bars 16, 18 and the support element 22 are formed. In this process, the longitudinal bars 14 are firmly embedded in the slightly thickened ends of the cross bars 16, 18. When the die is opened, the completed grid 10 may be removed.

In the example shown in FIG. 1, the cross bars 16, 18 are essentially formed as flat bands which have only a relatively low bending strength in the direction normal to the plane of the drawing in FIG. 1, so that they may be bent easily when they are loaded by the back of the user. At the same time, the cross bars thus form a relatively wide support area preventing them from cutting into the cushioning material of the seat back. The cross bars 18 which are formed in one piece with the support element 22 have a smaller width than the cross bars 16, so that they are elastically deformable also in the direction parallel to the longitudinal bars 14, when the support element 22 bulges and the distance between the upper and lower edges thereof changes.

In the example shown, the bending behavior of the cross bars 16 is controlled by providing reinforcement ribs 62 in the respective central portions.

Figure 3:
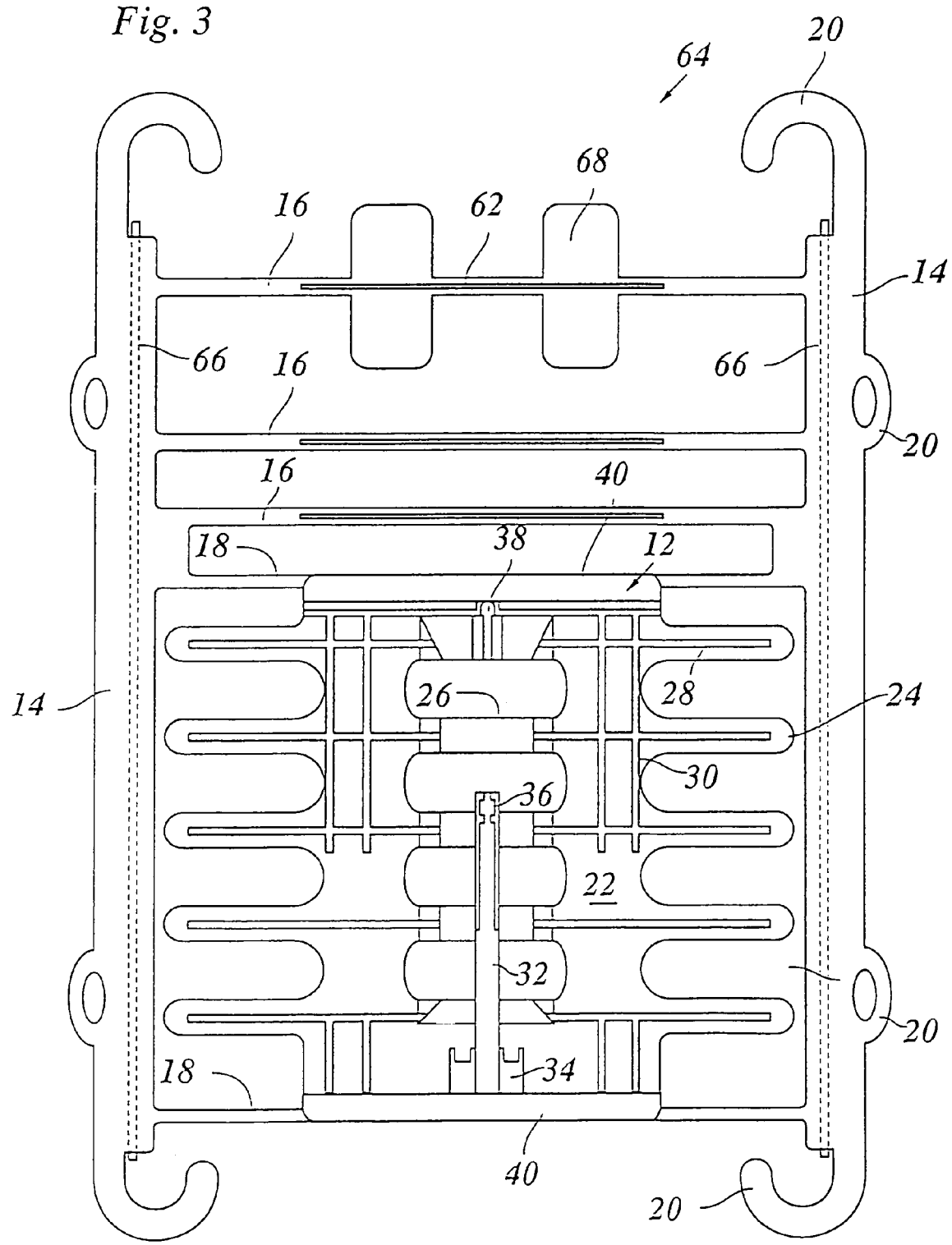
FIG. 3 shows a grid according to another embodiment.

FIG. 3 shows a grid 64 according to another embodiment. Here, the longitudinal bars 14 are also made of plastic, and they form a one-piece plastic member together with the cross bars 16, 18 and the support element 22. The longitudinal bars 14 have a flat, lens-shaped cross section and are reinforced by spring steel wires 66 that are embedded in the plastic material. The spring steel wires project out of the plastic material only at their ends, so that they may be supported there by the molding die.

The hangers 20 are in this case formed by eylets or hooks that are directly molded to the plastic material of the longitudinal bars 14. In this case, flaps 68 have been molded to the top cross bar 16 for improved distribution of forces.

The effective bending length of the cross bars 16, 18 may in this embodiment also be controlled by varying the width of the longitudinal bars 14. In the example shown, the longitudinal bars 14 have an inwardly increased width in the portion between the top cross bar 18 and the next cross bar 16 thereabove. This, in particular, has the consequence that the two cross bars 18 at the upper and lower edges of the support element 22 have different bending strengths. In this way, it is possible to control the displacement of the vertex of the bulge, when the support element 22 bulges.

The invention claimed is:

1. Seat inlay comprising:
   an elastic grid having at least two longitudinal bars having hangers for suspending the inlay in a frame of a seat, and cross bars which connect together the two longitudinal bars, wherein the cross bars are made of a plastic material and are molded to the longitudinal bars;
   a lordosis support having a plate-shaped support element made of plastic; and
   a single, one-piece molded structure comprised of the plate-shaped support element and at least one of the cross bars, with the plate-shaped support element and the at least one of the cross bars being made of the same plastic material.

2. Seat inlay according to claim 1, wherein the longitudinal bars are at least partly formed by metal.

3. Seat inlay according to claim 2, wherein the longitudinal bars are coated with plastic at least on a major part of their length.

4. Seat inlay according to claim 1, wherein the hangers are made of plastic.

5. Seat inlay according to claim 1, wherein the support element is adapted to be bulged by a bulge mechanism.

6. Seat inlay according to claim 1, wherein the cross bars differ in at least one of:
   shape, and
   bending strength.

7. Method of manufacturing a seat inlay according to claim 1, comprising the step of forming all the cross bars in one step in a single injection molding die.

8. Method according to claim 7, further comprising the step of inserting the longitudinal bars as straight bars into longitudinal grooves of the injection molding die.

9. Method according to claim 8, further comprising the step of bending the longitudinal bars in the injection molding die, with a part of the die serving as a bending template.

10. Method according to claim 7, further comprising the step of using a multi-tier die as an injection molding die for forming a plurality of grids simultaneously.

11. Method according to claim 7, further comprising the step of simultaneously molding the plate-shaped support element in one piece with said at least one of the cross bars with the same plastic material.

* * * * *